Dec. 22, 1936.   H. F. LEISSNER   2,065,283
LIQUID PACKING
Filed March 18, 1936

Inventor
Harry F. Leissner
By Sommers & Young
Attys

Patented Dec. 22, 1936

2,065,283

UNITED STATES PATENT OFFICE 2,065,283

LIQUID PACKING

Harry Ferdinand Leissner, Sodertalje, Sweden

Application March 18, 1936, Serial No. 69,580
In Sweden March 23, 1935

5 Claims. (Cl. 285—109)

The present invention relates to means for providing an efficient seal between relatively moving bodies, as for instance, between stationary and rotatable parts of a pipe line, receptacle or the like. A well known means for providing such a seal comprises an annular or cylindrical vessel open at its inner periphery, which rotates about the adjacent ends of the bodies and is adapted to contain a liquid maintained against the walls of the vessel by centrifugal force, the bodies being provided with flanges extending into said vessel and the liquid contained therein.

The object of this invention is to provide a liquid packing of this type which is especially suitable for pipe lines and the like, serving to convey or contain a fluid of a pressure below atmospheric.

The invention is characterized, chiefly, by the fact that the said annular or cylindrical vessel is carried by a disc or the like rotatably mounted inside the stationary part of the pipe line, receptacle or the like, which extends through the space between the flanges of the two parts, between which the tight connection is to be provided. By this means a very compact construction is obtained without any outer or exposed bearing elements.

Figure 1:
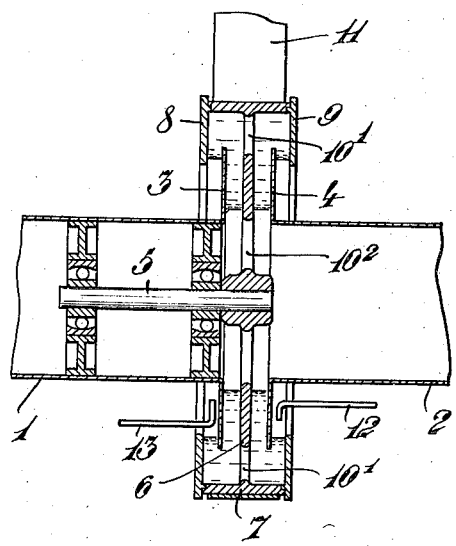
Figure 2:
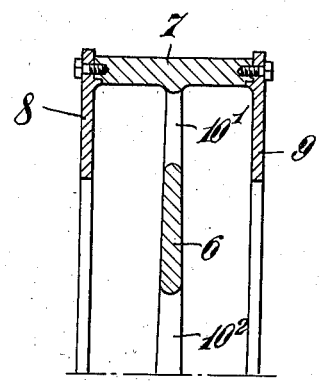

In the accompanying drawing one embodiment of the invention is illustrated. Fig. 1 is an axial section of the liquid packing device, and Fig. 2 is a detail section on a larger scale.

In the drawing the invention is illustrated in connection with a vacuum conduit between a stationary and a rotary part thereof. With reference to Fig. 1, the numeral 1 indicates a stationary pipe and 2 a rotary pipe of said conduit. The adjacent ends of these two pipes 1 and 2 are provided with outwardly extending flanges 3 and 4 situated in planes at right angles to the axis of the conduit on a comparatively large distance from each other. Rotatably mounted within the stationary pipe 1 is a central shaft 5 carrying a disc 6 extending between the flanges 3 and 4 and so dimensioned as to project beyond the outer circumference of the said flanges where it carries a cylindrical rim 7 provided with flanges 8 and 9 at its opposite ends, said flanges extending inwardly beyond the periphery of the flanges 3 and 4. Formed in the disc 6 are a set of apertures $10^1$ near the rim 7 and another set of apertures $10^2$, near the hub of disc 6. The rim 7 is formed as the rim of a belt pulley and is driven by a belt 11 from a source of power, not shown. By this means the drum, as represented by the rim 7 and its flanges 8, 9, may be rotated at a high speed. Into said drum, which is open at its inner periphery, I introduce a liquid, as water, through the pipe 12 while the drum is held in rotation. By the action of centrifugal force due to the speed of rotation, the liquid is caused to apply itself as an annular layer to the inner surface of the drum. The admission of water which may be intermittently or continuously, may be controlled in the usual way, as by a valve or the like. By the aid of an adjustable overflow pipe 13 any desired radial dimension of the annular liquid layer may be maintained, and through the same pipe the liquid may also be discharged, if required.

It is to be noted that under all conditions, the annular liquid layer should extend inwardly to such an extent as to allow the flanges 3, 4 to engage therein with their periphery, in order that the liquid may serve as a liquid seal between the interior of the pipe line and the atmosphere. Owing to the difference in pressure that exists between the vacuum prevailing in the pipe line 1, 2 and the atmospheric pressure, the radial thickness of the liquid layer will be greater between the flanges 3 and 8 or 4 and 9 than it is between the flanges 3 and 4. The amount of this difference in radial thickness is dependent upon the speed of rotation of the disc, and the specific gravity of the liquid.

As will appear from the drawing, the pipe 2 may rotate and displace itself both axially and radially without interfering with the sealing effect, and with exceedingly little frictional resistance.

Instead of water, any other appropriate liquid may be used, as, for instance, oil, mercury, acids or the like, the choice of liquid being dependent upon the purpose the packing is adapted to be used for.

The rotation of the cylindrical receptacle, as represented by the annular rim 7 and its flanges 8 and 9, may, of course, be effected in a different way or ways from that illustrated in the drawing, as for instance, by constructing the rim 7 to form a transmission element other than a belt pulley.

The disc to support the vessel may be replaced by any other appropriate connecting means, as a spider or the like.

What I claim is:—

1. In a liquid packing the combination with a stationary part and a rotatable part of a hollow body, of flanges on adjacent ends of said parts situated at a distance from each other, an annular vessel surrounding said flanges, said vessel being open at its inner periphery and adapted to contain a liquid, a shaft rotatably mounted in said stationary part, connecting means extending between said flanges to support said vessel by said shaft, and means for rotating said vessel to cause the liquid to apply itself as an annular layer to the inner surface of the vessel by centrifugal force.

2. In a liquid packing the combination with a stationary part and a rotatable part of a hollow body, of flanges on adjacent ends of said parts situated at a distance from each other, a shaft rotatably mounted in said stationary part, an apertured disc carried by said shaft so as to extend outwardly between said flanges, an annular vessel carried by said disc at the outer periphery thereof so as to surround said flanges, said vessel being open at its inner periphery and adapted to contain a liquid, and means for rotating said vessel to cause the liquid to apply itself as an annular layer to the inner surface of the vessel by centrifugal force.

3. The combination of a stationary pipe, a rotatable pipe, flanges on adjacent ends of said pipes situated at a distance from each other, a shaft rotatably mounted in said stationary pipe, an apertured disc on said shaft extending outwardly between said flanges, an annular vessel carried by said disc at the outer periphery thereof so as to surround said flanges, said vessel being open at its inner periphery and adapted to contain a liquid, and means for rotating said vessel to cause said liquid to apply itself as an annular layer to the inner surface of the vessel by centrifugal force.

4. In a liquid packing the combination with a stationary part and a rotatable part of a hollow body, of flanges on adjacent ends of said parts situated at a distance from each other, an annular vessel surrounding said flanges, said vessel being formed as a belt pulley at its outer periphery while open at its inner periphery and adapted to contain a liquid, means rotatably mounted in said stationary part for supporting said vessel, and a driving belt for rotating said vessel to cause the liquid to apply itself as an annular layer to the inner surface of the vessel by centrifugal force.

5. The combination of a stationary pipe, a rotatable pipe, flanges on adjacent ends of said pipes situated at a distance from each other, a shaft rotatably mounted in said stationary pipe, an apertured disc on said shaft extending outwardly between said flanges, an annular vessel carried by said disc at the other periphery thereof so as to surround said flanges, said vessel being formed as a belt pulley at its outer periphery while open at its inner periphery and adapted to contain a liquid, and a driving belt for rotating said vessel to cause said liquid to apply itself as an annular layer to the inner surface of the vessel by centrifugal force.

HARRY FERDINAND LEISSNER.